May 21, 1968   D. RUBENSTEIN   3,384,522
METHOD OF MAKING COMPOSITE DECORATIVE STRUCTURAL ELEMENTS
Filed Dec. 28, 1965
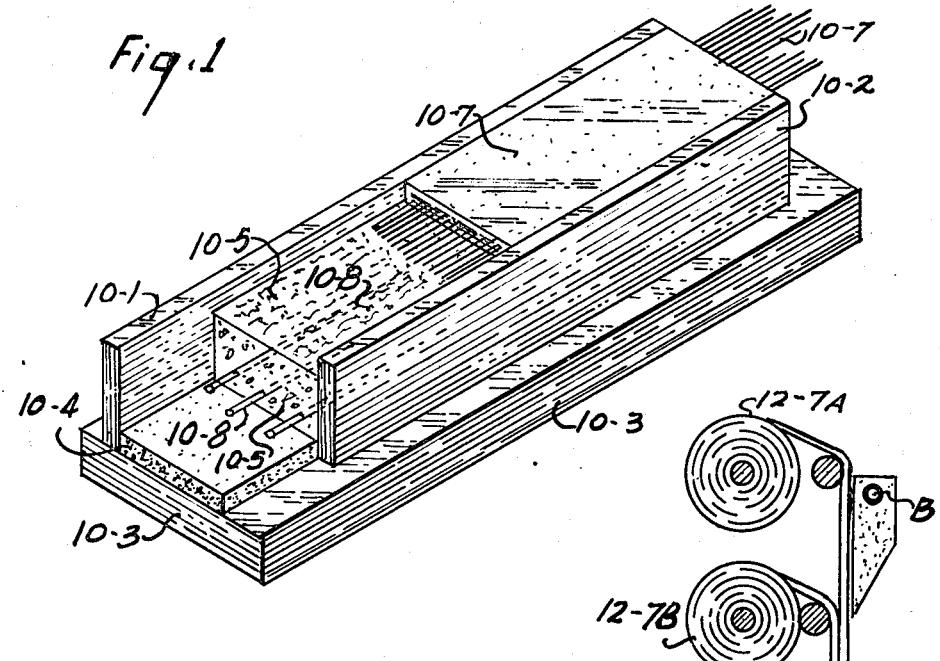
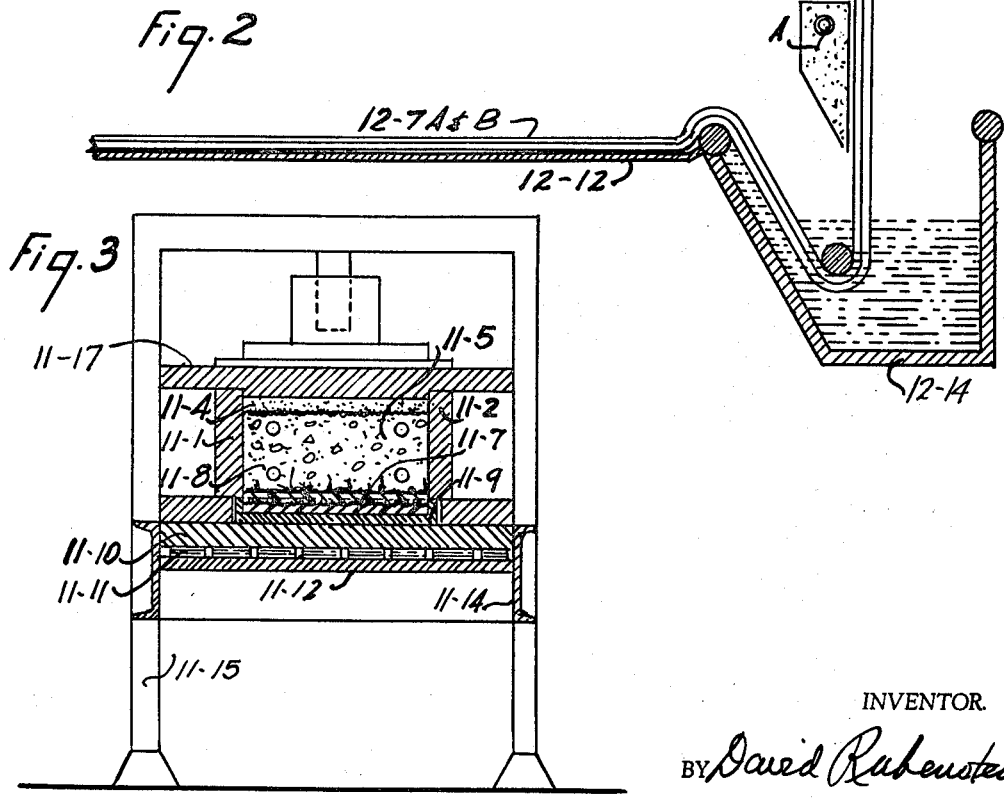
INVENTOR.
BY David Rubenstein

3,384,522
METHOD OF MAKING COMPOSITE DECORATIVE STRUCTURAL ELEMENTS
David Rubenstein, 2750 2nd Ave., San Diego, Calif. 92103
Continuation-in-part of application Ser. No. 126,427, July 11, 1961. This application Dec. 28, 1965, Ser. No. 517,160
10 Claims. (Cl. 156—242)

ABSTRACT OF THE DISCLOSURE

This patent application relates to a system of manufacturing and fabrication of elements and slabs having poured porous and core-like materials having laminated and bonded reinforcing elements, strands, webs and layers. The porous and core-like materials may have a stone-like, ceramic, concrete, clay product, cellular or other porous structural material body having the properties of structure for various embodiments and adapted to combination with other improved materials of the invention comprising organic and inorganic fibers and reinforcements, whiskers, mineral fillers and fibers, synthetic fibers, boron nitride fibers, beryllium fibers, graphite fibers, silicon carbide whiskers, and polymerizable polymeric resin compositions, cements and steel reinforcements. Decorative and functional surface construction layers and load bearing constructions are features of some of the embodiments of the invention.

---

This application is a continuation-in-part of my co-pending patent application Ser. No. 126,427, filed July 11, 1961, now U.S. Patent No. 3,236,015.

This invention relates to a system of fabrication of porous structural elements and composite materials having a stone-like body, ceramic body, masonry concrete body, clay product body, or other porous structural material body, or cellular body having the properties of structure adapted to combination with the other improved materials of the invention.

An object of the invention is to make an article of manufacture comprising a decorative-structural porous structural element of slab having a colored aggregrate concrete facing layer, an inner core of structural concrete, and a laminated reinforcing fiber-polymeric resin composition decorative-structural facing layer.

An object of the invention is to provide a continuous process adapted to mass production providing the product of the invention.

An object of the invention is to provide product of the invention existing in a prestressed preloaded state.

An object of the invention is to provide product of the invention in planar slabs, circular embodiments, curved and compound curved embodiments, and low-relief sculptured embodiments and the like.

In my patents, No. 2,671,158, No. 2,805,448, No. 2,850,890, No. 2,950,576, No. 2,951,001, No. 2,951,006, No. 3,111,569, No. 3,145,502, No. 3,150,032, No. 3,177,902, and No. 3,164,071, I disclose and claim a plurality of improvements and structure in decorative-structural and structural embodiments. In some of these prior disclosures of record I disclose features of the instant invention, but because of classification requirements in accord with the Rules of Practice before the Commissioner of Patents, features of the prior disclosures are claimed herein in combination with the features of the instant invention.

I have found that the materials used which comprise polymeric resin compositions, rubbers, synthetic rubbers, elastomerics of both thermosetting and thermoplastic-thermosetting compositions, and thermoplastic compositions, require apparatus and method in their use particularly adapted to economical and practical low cost procedures involved in making the products of this invention. In the improved structure afforded by these inventions the use of fibrous materials requires means directed to insuring the primary strength of a very high order found, e.g., in glass-fibers, or polyethylene terephthalate, or acrylic fibers, etc., be protected against damage before their final end use. New fibers such as inorganic fibers of boron nitride, a white, silk-like fiber can withstand deterioration in oxidizing environments up to 1700° F. and up to 4500° F. in inert atmospheres. Such fiber does not react to molten iron, silicon, aluminum, cryolite, copper, zinc, and chlorine has little effect up to 1300° F. The fiber has a tensile strength of over 200,000 p.s.i., a modulus of elasticity of 13,000,000 p.s.i., and a good strength-to-density ratio. In embodiments of this invention, it is useful as insulation, radiation shield, and protective covers for other lower cost reinforcing fibers or metals of the invention. Other new fiber reinforcements comprise beryllium, graphite, and silicon carbide. A number of strong whiskers, i.e., tiny single crystal fibers, have been produced by the Carborundum Company of Buffalo, N.Y., as well as many other refractory materials and fibers. Commercially available single crystal silicon carbide whiskers can withstand stresses in excess of 3,000,000 p.s.i. Composite materials using silicon carbide whiskers can provide these composite materials with a strength/weight ratio as much as four times that of the strongest steel. Modulus of elasticity of such silicon carbide whiskers is 70,000,000 p.s.i. These fibers as whiskers maintain their strength in an oxidizing atmosphere up to 3180° F. and in a vacuum to 3600° F. They are chemically inert and non-toxic at high temperatures. Silicon carbide whiskers provide strong low temperature characteristics being unchanged at −450° F. and also are opaque to infrared radiation. In addition to random orientation that these whiskers normally assume in a molten metal or resin matrix, they can be arranged and directionally controlled by electrostatic or other means and be made to orient themselves unidirectionally or radiate from the center, or in other predetermined selected patterns to create a foil or ribbon or sheet of material or reinforcement of tremendous strength. A light weight epoxy resin having such whiskers as fillers or directionally placed reinforcements, or both, can be brought to be comparable to the tensile strength of unreinforced steel. The rapidly expanding art of new reinforcement materials applicable to end use requirements of this invention will be utilized and features thereof further later explained.

Chemical formulations require specialized "know-how" and in this patent application methods and apparatus and formulations disclosed but not claimed in prior applications as for example, Ser. No. 345,084, filed Mar. 27, 1953 the application thereof being abandoned but not the inventions disclosed therein, Ser. No. 498,715, filed Apr. 1, 1955 now U.S. Patent No. 3,145,502, Ser. No. 558,734, filed Jan. 12, 1956 the application thereof being abandoned but not the inventions disclosed therein, and in particular, Ser. No. 542,658, filed Oct. 25, 1955 the application thereof being abandoned but not the inventions disclosed therein, are again disclosed herein and are referred to herein, the substantive subject matter of said applications applicable to the instant invention being referred to as though herein transcribed and as such is considered basic disclosure in this application.

The instant disclosures together with various ancillary objects and features of the invention which will later become apparent as the following description proceeds, are attained by the instant invention, preferred embodiments of which are herein illustrated, by way of example only, and not considered in any way as limiting the features of the invention, said illustrations being in the accompanying drawings, wherein:

FIGURE 1 is an isomeric view of a portion of a means for making a polymeric resin composition fibrous material reinforced concrete of the invention;

FIGURE 2 is a view of apparatus for processing the impregnated fibers of the invention;

FIGURE 3 is a view of a press apparatus for utilizing the concepts of this invention in making embodiments of this invention.

The FIGURES 1, 2, and 3 illustrate various embodiments of the invention wherein is shown means of making a finished two sides, three sides or four sides, decorative-structural element or member in a continuous placing and processing of the materials.

On a form pallet 10–3 are placed side forms 10–1 and 10–2 and into this forming means a layer 10–4 of white or colored portland cement concrete having a discrete water content is placed. This concrete may have colored aggregates or may be of Ottawa white sand or crystal silica as from Oceanside silica deposits or the like, so that an attractive stone face is provided when the face of the member is set up.

Next on top of this face layer 10–4, a layer of standand portland cement concrete mix is placed forming the body or core structure 10–5 of this embodiment of this invention, e.g., a panel unit for use in a tilt-up construction, or other slab or panel type use. Both the face layer 10–4 and the core or body structure 10–5 is made with just enough water to cause setting of the portland cement and is considered in the art as a "dry-mix." Upon the screeded surface of such a mix a layer of polymeric resin composition that is not sensitive to water or alkali of such a cement mix is placed as by the apparatus of this invention or by apparatus having features of the parent application Ser. No. 126,427, filed July 11, 1961. Such a polymeric resin composition comprises a formulation of polysulfide rubber-epoxy resin composition, or a formulation of a polyamide-epoxy resin composition, or composite formulations of epoxy-polyester resin compositions as disclosed in my parent application and related U.S. Patents No. 3,111,569 and No. 3,177,902.

Alternatively, an embodiment of the invention is made by placing an additional reinforcing layer at the interface between the decorative-structural facing layer and the structural concrete layer which layer comprises a woven fiber-polymeric resin composition layer having a surplus of resin composition impregnated into said structural concrete.

In accordance with requirements of any particular design involving the structural engineering of the particular design then being made, steel reinforcing of wires, bars, rods, or members, alone, or in combination with my invented glass fiber cables shown in my U.S. Patent No. 3,111,569, or roving or mat or other composed glass fiber or other fibrous constructions of my invention or known, may be installed in the concrete mix 10–5 and as shown as elements 10–8.

Such an article of manufacture comprises an article made by the method comprising providing a decorative-structural porous structural element having a white portland cement-colored aggregate facing layer, and inner core of structural material concrete, and a laminated reinforcing fiber-polymeric resin composition decorative-structural facing layer comprising the steps of; first step, providing a rigid forming means adapted for placement on a heated platen of a pressing means; second step, placing on said rigid forming means on its smooth prepared surface a quantity of white portland cement-colored aggregate concrete to a selected thickness to make a decorative-structural layer, said white portland cement concrete being a discretely mixed concrete mixture having just enough water to cause the setting of the said white portland cement, said concrete then being compacted and leveled into a substantially uniform layer; third step, immediately after second step, place on said layer of white portland cement concrete a layer of structural concrete to a selected thickness and level and compact said structural concrete to a substantially even layer thickness; fourth step, immediately after third step place on said structural layer, a layer of polymerizable polymeric resin composition fiber reinforced laminated material, forming said laminated material by drawing and pulling a plurality of glass fiber stranded unidirectional elements from two separate reel-units and pulling one of the said stranded elements from one of the reels into a container of epoxy curing agent and from the other reel-unit pulling the other said stranded element into a container of epoxy resin composition, said impregnated strands being pulled together through a sizing means and placed as a unit upon the surface of said layer of structural concrete, said impregnated strands then being covered with a selected mineral filled layer bonded together with a polymerizable resin composition in its uncured state; fifth step, with all said layers in place, bring the upper platen of the press down after covering the surface exposed to the press with a film type mold release; sixth step, apply pressure to said press and heat said platen of said press to a selected temperature and consolidate and compress the said layers into a unitary decorative-structural element and hold under pressure for a selected time and cure to a selected amount; seventh step, when said element is cured place it in a post curing chamber to complete the cure of the concrete and post cure the polymeric resin compositions, said element after said post cure being ready for use.

FIGURE 2 shows reel-unit of fibers, e.g., glass fiber tapes wide enough to cover the surface of the panel face comprised of tape 12–7A and tape 12–7B which are united after impregnation between feeder type heads A and B feeding resin compositions A and B as e.g., provided in a device of the parent application or in this application.

The combined impregnated glass fiber tapes are drained into the vessel 12–14 so that the surplus resin composition is removed as the tape is pulled over the edge of the vessel, or the combination of the two tapes is made after each is pulled through sizing rolls or other gauging means and the surplus resin composition returned to the feeder means. The importance of gauging means is real and important in having fresh resin materials placed together to insure several features of processing wherein quality control, quantity of materials used, nature of the capabilities of structure resulting in the combination, features of prestressing preloads into porous structural material of a given decorative-structure, and other aspects of the use of resinous and related materials to insure reproducibility, low costs and resulting integrity of structures designed and made.

The combined tapes 12–7A and B are disposed in a caul or pan 12—12 in one embodiment of the invention. Alternatively, the combined impregnated tapes may be placed directly on the layer of concrete 10–5, or may be used to join together two adjacent members or elements in horizontal combination or joinery, or in vertical combination or joinery as in the parent application. Also the combination of decorative-structural members or slabs or beams, or even combination unitary members comprising beam and slab construction as in large precast and prestressed preloaded concrete T-beams and double T-beams as known in the art can be made as the composite structures of this invention are made.

In the use of various pressure forming means as in the press means of FIGURE 3 not only is it possible to obtain unitary structure in one continuous series of operations but features of low relief, raised surfaces, sculptured faces, patterned, striated, pebble milled features of surface, glass-like faces, mat-like faces, composite decorative features obtained from the face of the caul or molding platens or pans or other molding means, e.g., strippable films or sheets, as e.g., cellophane, cellulose acetate, polyethylene, etc., are useful means in obtaining decorative objectives while in the process of manufacturing a composite structural embodiment of this invention. A portion at least, or in some cases all the materials used provide decorative features as well as structural features from materials used having the two function concept of decoration and structure in their design and use.

In FIGURE 3 the caul or pan or molding means is filled with an impregnated fibrous construction 11–7, said caul or pan or mold being element 11–9, and this construction may be in a B-stage compounding of the resin composition art. Elements 11–1 and 11–2 show the vertical sides of the mold box. Element 11–12 shows the bottom bearing plate of the press. Element 11–11 shows the heating elements comprising strip heaters or the like. Element 11–14 shows a channel iron frame of the press and element 11–15 shows a leg of the press. Alternatively, the caul, or pan, or mold may be first filled with a mineral having a discrete polymeric resin binder or a discrete mineral, binder and fiber reinforcing means, or whisker reinforcing means, which first layer is placed on the surface inside of the caul, or pan, or mold after mold release material is applied to said inside surface of said caul, or, pan or mold, which first layer is leveled by vibration means or other means known, e.g., doctor blade means, and placed on conveyor to enter press. The fibrous construction 11–7 is then placed over the layer of facing material comprising discrete, i.e., selected mineral particles or materials having a polymeric resinous binder, etc. In certain embodiments composite reinforcements of steel, or prestressing steel wire, or rod or cables, or in fact any of the ceramic or inorganic fibers or reinforcing materials referred to in column 2 supra, may be used. With these materials glass fibers or synthetic fibers, or polymeric fibers of resinous materials may be used to make composite structural and composite decorative structural or specialized functional designed constructions. Linear or other forms of materials of the reinforcing means may be prestressed preloaded by mechanical means, thermal means, or chemical means, or physiochemical means alone by each means or in compatible combination or combinations to provide embodiments of this invention. My prior art of record in my prior patents provide several means of making and products with which to make embodiments of this invention.

On top of this impregnated fibrous construction 11–7, the concrete mix 11–5 is placed in a discrete wet state, i.e., the amount of water in the mix is carefully controlled to have just enough water to set the mix and form a homogeneous concrete mixture. On top of the concrete mix 11–5, a decorative-structural layer of material is placed, e.,g., if a simulated Bedford stone face is desired, a layer of white portland cement and Ottawa sand in known mix, e.g., one part white portland cement such as Medusa White and two parts of Ottawa sand in graded mix of 16 mesh, 30 mesh, and 60 mesh, so as to provide stone-like surface after the said surface is sprayed with a fine spray of water after cure is initiated.

As required by each designed product to meet structural engineering requirements, or fireproofing requirements, or chemical resistance requirements, or radiological requirements, or cryogenics requirements, or high temperature requirements, selected materials are incorporated in the total design of the said products then being made.

When designed into the construction, reinforcing elements 11–8 or its equivalent in view of statements supra, are incorporated as designed or desired. With the polymeric resin composition and its fiber reinforcement layer in place or a polymeric resin-filler and fiber composition and its fiber reinforcement in place in the molding means, and with the structural concrete layer or core 11–5 in place over the polymeric resin composition first layer, and with the decorative-structural portland cement concrete layer 11–4 in place on said structural layer or core layer 11–5, the entire assembled materials are rolled or placed into a press having a heated platen 11–10 and a press head 11–17. A selected amount of pressure at a discrete and selected amount of temperature in the platen 11–10 is induced into and pressed into the assembly of materials and selected compression forces are thus exerted to compress the assembly of materials for a selected period of time, e.g., five minutes, or whatever curing time cycle is provided in the particular formulated processing of materials then being used.

The heated platen set, e.g., at 300° F., provides the heat energy to develop setting and curing of the polymeric resin composition or system then being used. When the curing cycle is completed, or the pressure cycle is completed, whichever is the governing processing cycle, the materials are in a composite state and removed as product from the press for further processing or for ready-for-use. The forming means may be removed at this time or may be kept in place while features of additional processing takes place. If the concrete core component is subjected to further cure, or if the placement of additional elements requires it, the caul, or pan, or molding means is left in place, or portions thereof, on the member or element until a full cure is had of the concrete components, or of the polymeric resin compositions components, or any other materials involved in being integrated into the composite structure of the embodiment then being made that is subject to a cure cycle to attain selected and desired structure. The concrete components and the polymeric resin components may be placed in a steam curing tunnel or an autoclave as is known in the art.

By utilizing the devices and apparatus and process of this invention, a means is provided to precast a reinforced or prestressed reinforced concrete embodiment, element, or member, or composite structure of the invention by means of the invention process or by means known but not shown, as e.g., prestressing preloading means of my invention or known in the art, which at the same time the concrete components are being cured, the polymeric resin compositions-fiber-filler composite structural or decorative-structural materials are being cured, and a composite structure, e.g., a fiberglass reinforcing laminated decorative-structural concrete slab or panel or in fact, and as disclosed supra, any composite structure of the invention may be completed in a minimum of time. In addition, the bringing together of the combination of materials at one time provides a minimum of cost and a minimum of internal stresses that are not used in a beneficial manner. By arranging the conveyor and dispensing means of the materials used about a prestressing bed, the prestressed reinforced concrete member can be made as a continuous extrusion incorporating the several elements shown in FIGURE 3.

Of interest in making such embodiments of this invention, I have found that several polymeric resin systems may be cured in 3 to 10 minutes, but not limited thereto, as many other time systems of curing may be used. Particularly advantageous to this invention are the systems of curing involving staged or step type curing wherein features of processing by reaching a state of cure which, e.g., provides the product in a condition for handling and moving and for the addition of other features of the materials of the composite structure to be added while yet attaining the desired composite structure. Post curing of polymeric resin compositions while steam curing of the concrete aggregate mixtures is such a means.

However, to illustrate one of the curing systems employed in making the invention, a polyester-epoxy-polyamide resin composition is employed in staged curing. An aggregate mix of blended sized colored aggregate, glass fiber and unsaturated polyester resin composition having selected end use properties, e.g., isophthalic unsaturated polyester resin composition, as the binder for said aggregates is placed in a mold to a depth of e.g., one-half inch. On this layer is then placed a woven fiber glass fabric, e.g., 60 end roving in both directions and which fabric has been impregnated with said epoxy-polyamide resin composition, and having been placed when both the polyester resin system and the epoxy-polyamide resin system are at a partially cured state and able to bond one to the other. One preferred state of cure provides the isophthalic polyester resin composition bonded aggregate surface layer in a non-flowable state when the epoxy-polyamide resin composition impregnated glass fiber woven roving is placed thereover. The isophthalic unsaturated polyester resin composition may have an ambient type curing benzoyl peroxide catalyst with a 6% cobalt naphthenate promoter or accelerator or other known means of catalyzation known in the art. The epoxy-polyamide system cures by action of the two resin systems, polyamide resins of a selected nature being curing agents for epoxy resins. Alternatively curing systems may be employed requiring the heat of a platen to induce setting and curing and these are well disclosed in the art and in my patents. Heat systems are employed for timed periods and the exothermic heat of the reactions must be taken into account in selection of the concrete placed thereover said glass fiber woven roving reinforcement. In addition when desired, a surface fiber reinforcement may be utilized prior to laying the face layer and this may be of any one of many functionally used or decoratively used materials of glass fiber, hemp, jute, synthetic fibers, fire resisting materials, whiskers as above described ceramic fibers, asbestos fibers, selected mineral particles, e.g., aluminum silicates, or in fact any of the functionally selected materials required in a given structure.

With the face layer in place and the woven glass fiber roving reinforcement in place with its epoxy-polyamide resin composition, additional epoxy-resin composition is applied if needed and then the concrete mix comprising the core or structure of the embodiment is poured in place over the epoxy-polyamide resin composition just laid. The concrete core may be reinforced with steel or glass fiber reinforcing bar, rod or cable and may be prestressed preloaded after cure or during cure. If mechanical prestressing the steel or glass fiber reinforcements is required in the design, the reinforcements may be placed in desired prestressed preload and the concrete poured around the reinforcements.

With the core structure in place, the upper face of the embodiment is placed comprising e.g., a white portland cement-silica sand facing mixture of e.g., 1 part cement and two parts graded silica sand, e.g., crystal silica of Oceanside, Calif., which layer is placed e.g., one-inch thick over the concrete core. Both the core concrete and the white facing layer has just enough water to set the mix and still handle with a desired workability from the respective mixers and conveying equipment.

With all components of the embodiment then being made in place, the top of the press having a smooth or patterned surface or other decorative features, e.g., a decorative low relief motif, is pressed down onto the said materials in the mold and pressure exerted to consolidate the unsaturated polyester resin bonded face layer, the epoxy-polyamide resin composition woven roving fabric reinforcement, the interface bonding resin or epoxy-resin bonding resin, the concrete core and the white portland cement-silica sand surface layer. Heat from the platen may be used to advance the unsaturated polyester resin composition to a state of cure which heat plus the exothermic heat will cure the interface epoxy resin composition as well as the epoxy-polyamide resin composition roving glass fiber fabric reinforcement, the heat from the polymeric resin compositions being of short duration will start cure of the concrete but will not affect the concrete adversely. When consolidation is completed the embodiment as a slab or member or beam as designed is removed from the press and placed into a steam curing chamber and the concrete cured to a state of cure and the polymeric resin compositions subjected to a post cure, and to a designed chemically engineered and structurally engineered design.

Just prior to placing the embodiment in the curing chamber the face of the white portland cement face may be sprayed with a very fine low pressure water spray to expose the silica sand and remove laitance.

The term concrete used in the patent application is a broad definition wherein the binder material which holds the mineral aggregates, or other type aggregates together may be portland cement, natural cements, white portland cement, polymeric resins of both thermoplastic and thermosetting types, silicates, ceramic type binders, and in fact any material having the properties desired in specific embodiments of the inventions herein. The concrete aggregates may be mineral or metal particles, glass, mineral fibers, inorganic fibers, organic materials and fibers, each or combinations thereof selected for specific embodiments of this invention. The following examples show preferred embodiments of structure but no limitation is intended in the structural and/or decorative-structural features of this invention because of the improved materials now available and becoming available in commercial production.

Example I

A resinous bonded facing layer may be made as follows:

| | Parts by weight |
|---|---|
| Unsaturated isophthalic polyester resin: | |
|     Rigid type | 228.6 |
|     Flexible type | 22.4 |
| Benzoyl peroxide paste—50% assay in tricresyl phosphate | 3.24 |
| Styrene monomer | 20.00 |
| Benzoyl peroxide, 60% assay in methylethyl ketone | 1.86 |
| Cobalt naphthenate, 6% | 0.86 |
| Onyx granules, from 60 mesh to ⅛" diameter | 450.00 |
| Chopped glass fiber | 10.00 |

The onyx and the chopped fiber can be varied in amount to achieve workability and esthetic features of color.

Reinforcement layer can be as follows:

Epoxy resin—Shell Chemical Co.
  #828 _____parts by weight__ 60.00
Polyamine resin — Versamide
  #140—General Mills Co. _____do____ 40.00
Known accelerators (may be used
  to speed up curing, e.g., DMP
  30 — tertiary amine catalyst)
  tri - (dimethylaminomethyl)
  phenol—Rohm & Hass Co. _____do____ 5–20
Toluene (aromatic hydrocarbon may be used as a
  thinner) _____do____ 5–20
Woven glass fiber roving:
  W–60 end-F40 end _____ 2 x 1
  United Merchant's industrial fabric _____ ×648
Resin to glass fiber ratio __ 65% glass fiber to 35% resin
Interface layer—same as reinforcement layer _mils__ 10
  Dry portland cement may be placed over resin
    interface layer _____ 10 mils, more or less
Concrete mix core layer can be as follows:

| | Lb. |
|---|---|
| Silica sand—concrete grade—sp. gr. 2.63, fineness modulus—2.75 | 1,140 |

Coarse aggregate—specific gravity—2.68 (max. size ¾ in.) _____ 2,070
Water _____ 245
Type V portland cement—sp. gr. 3.15 _____ 490

Follow concrete making procedures of United States Department of the Interior, Bureau of Reclamation, as given in its "Concrete Manual."

Example II

A resinous-mineral facing layer can be made as follows:

Epoxy resin—Dow Chemical Co. or Bakelite or Shell
Epoxy resin—bonding resin—15,000 to 20,000 p.s.i. flexural or tensile strength for low order strengths may be used.
Bakelite 70,000 to 89,000 p.s.i. flexural strength for high order strengths may be used.
Mineral fillers of silica, or crushed rock, or complex calcium carbonates may be used for decorative effects. Size of filler particles determines color and texture.

Example III

A heat resistive decorative surface may be made by using the following:

Epoxy resin—Shell No. 826 _____parts by weight__ 25
Silicon Carbide whiskers _____do____ 75
Curing agent—meta-phenylenediamine, cure at 140 to 180° F. to 400° F. _____phr__ 14

Example IV

A core concrete can be made as follows:

Silica sand 30, 60 and 16 mesh—equal parts _lbs__ 169
CaCo3—calcium carbonate—Snowflake (Whitaker, Clark & Daniles, N.Y.) _____lbs__ 85
Chopped fiber—glass fiber—short _____lb__ 1
Unsaturated polyester resin—Interchemical Corp. Chem-Stress #770 _____lbs__ 35.0
Styrene monomer _____lbs__ 7.0
Methylethyl ketone peroxide catalyst ___grams__ 150.0
Cobalt naphthenate 6% _____do____ 20.0
Shell Chemical Co. #826 (if a stronger binder is desired) _____lbs__ 25
Polyamide resin (General Mills Co. V-140), add up to 10 pounds vinyl toluene or workability _____lbs__ 15

Example V

A very strong bonded prestress reinforcement may be made for use in the core structure or in other uses as follows:

Use Robeling & Sons Company prestressing steel cable of selected diameter, e.g., ⅜" and wrap it in unidirectional Nuf, a glass fiber fabric from Ferro Corp. with at least two windings that are impregnated in the polymeric resin composition of Example I. Place in wet condition in concrete mixture or if concrete is preset when two elements are combined.

The embodiments and examples of the present application are in part substantially identical with those given in the parent application mentioned herein, and as a companion case that covers distinct inventions, or as to disclosures made in prior applications but not claimed therein. It is to be understood by those versed in patent law and practice that this because these practical articles, apparatus and methods embody several inventions, each or some of which can be used with or without the others, i.e., some of the inventions thus used may be considered optional or can be replaced with alternatives.

The examples and alternatives given should not be regarded as exhaustive or limiting of this invention, but on the contrary, are given for the purpose of instructing others in the best manner of using and applying the invention and so far as to explain and illustrate the principles thereof that others will be enabled to use the invention in many modifications and various embodiments, each as may be best suited and adapted to the requirements of a particular use.

The instant invention is directed to the structural and decorative-structural embodiments disclosed. Where definitions are sought for concrete in the ordinary usage of the word, please refer to the Bureau of Reclamation Concrete Manual mentioned supra. In the boarder use of the word concrete the definitions given herein and in my other patents governs as the preferred usage. Any porous structural material bonded together by chemical manner and means wherein cementitious bond is provided as in the use of portland cement as well as polymeric resin bonding together by thermoplastics and/or thermosetting polymeric resins compositions are means of manufacturing concrete useful in this invention. Modern Plastics Encyclopedia serves as a basis for definition of polymeric resin compositions and the manufacturers thereof also so serve.

The fibers disclosed herein are governed by the definition of the art and the Modern Plastics Encyclopedia serves as a history of the art.

"Whiskers" and related ceramic fibers are defined in the product literature of "Advanced Materials Technology" a publication of The Carborundum Company, Niagara Falls, N.Y., and in Technical Bulletins by H. I. Thompson Fiber Glass Co., Gardena, Calif.

Each product made and the methods used are governed by structural engineering codes as defined in the concrete art by the American Concrete Institute and the prestressing art as defined in my patents. New composite structure herein involves more than one code consideration and the definitions herein and from empirical tests made to derive the proofs of invention can govern.

While certain preferred embodiments of this invention have been specifically disclosed, it is understood that the invention is not limited thereto, as many variations will be readily apparent to those skilled in the art and the invention is to be given its broadest possible interpretation within the terms of the following claims.

Having described the invention, what I claim as new is:
1. The method of making an article of manufacture comprising a decorative-structural porous structural element having a white portland cement-colored aggregate facing layer, an inner core of structural concrete, and a laminated reinforcing fiber-polymeric resin composition decorative-structural facing layer comprising the steps of:
   first step, providing a rigid forming means adapted for placement on a heated platen of a pressing means;
   second step, placing on said rigid forming means on its smooth prepared surface a quantity of white portland cement-colored aggregate concrete to a selected thickness to make a decorative-structural layer, said white portland cement concrete being a discretely mixed concrete mixture having just enough water to cause the setting of the said white portland cement, said concrete then being compacted and leveled into a substantially uniform layer;
   third step, immediately after second step, place on said layer of white portland cement concrete a layer of structural concrete to a selected thickness and level and compact said structural concrete to a substantially even layer thickness;
   fourth step, immediately after third step, place on said structural concrete layer, a layer of polymerizable polymeric resin composition fiber reinforced laminated material, forming said laminated material by drawing and pulling a plurality of glass fiber stranded unidirectional elements from two separate reel-units and pulling one of the said stranded elements from one of the reels into a container of resin epoxy curing agent and from the other reel-unit pulling the other said stranded element into a container of epoxy resin composition, said impregnated strands being pulled together through a sizing means and placed as a unit upon the surface of said layer of structural concrete;

fifth step, with all said layers in place, bring the upper platen of the press down after covering the surface exposed to the press with a film type mold release;

sixth step, apply pressure to said press and heat said platen of said press to a selected temperature and consolidate and compress the said layers into a unitary decorative-structural element and hold under pressure for a selected time and cure to a selected amount;

seventh step, when said element is cured place it in a post curing chamber to complete the cure of the concrete and post cure the polymeric resin compositions, said element after said post cure being ready for use.

2. The method of making an article of manufacture as in claim 1, in which the concrete facing layer comprises inorganic fibers selected from the group consisting of mineral whiskers or boron nitride, beryllium, graphite, and silicon carbide bonded together with a epoxy resin composition.

3. The method of making an article of manufacture as in claim 1, in which an additional reinforcing layer is placed at the interface between the decorative-structural facing layer and the structural concrete comprising a woven fiber-polymeric resin composition layer having a surplus of said resin composition impregnated into said structural concrete.

4. The method of making an article of manufacture as in claim 1, in which in addition cover said impregnated strands with a decorative mineral filled layer bonded together with a polymerizable resin composition.

5. The method of making an article of manufacture comprising a decorative-structural porous structural element having a laminated reinforcing fiber-polymeric resin composition-filler decorative-structural facing layer, an inner core of structural concerete, and a mineral bound colored aggregate facing layer comprising the steps of:

1st step, provide a heated platen press upon which assemble a rigid forming means having inside of said forming means a caul or pan vessel;

second step, coat said pan with a mold release agent and heat above ambient temperature but below the curing temperature of the polymerizable polymeric resin composition impregnated fiber reinforcing material to be placed into said pan;

third step, draw and pull a layer of polymerizable polymeric resin composition impregnated fiber reinforcing material into said pan vessel by drawing and pulling a plurality of units of said fiber reinforcing material from two separate reels and pulling one said units of fiber reinforcing material into a container of polyamide resin and covering and coating said material to a selected amount, and from the other reel-unit pull the other fiber unit reinforcing material into a container of epoxy resin composition, said impregnated two fiber units being pulled through a sizing means that comingles the said two polymeric resin compositions and place as a unitary layer into said pan vessel;

fourth step, place on said polymerizable polymeric resin composition impregnated fiber reinforcing material a layer of selected thickness of structural concrete;

fifth step, following the fourth step, place a selected white portland cement-colored aggregate concrete cover layer on said layer of structural concrete;

sixth step, close the heated platen press and apply pressure to consolidate the said layers of materials and leave in the said press for a selected time to set and cure the said polymerizable polymeric resin composition, seventh step, on completion of said cure of said polymerizable resin composition at least to a non-flowable stage of cure, remove the pressure means from the press and remove the said structural element to a spray table means whereby a fine mist spray is provided to the face of the white portland cement colored aggregate concrete surface which spray of water in said fine mist exposes the colored particles at the surface of said layer of white portland cement concrete showing decorative features to view;

eighth step, place the compressed assembled materials in a steam curing chamber for a selected time to cure said structural concrete and said white portland cement concrete decorative-structural layer, and when cured remove ready for use.

6. The method of making an article of manufacture as in claim 5 in which at least one prestressed strand of material is held in position under stress in a state of tension in the structural concrete layer of said article of manufacture, said stress inducing means being released after said structural concrete sets.

7. The method of making an article of manufacture as in claim 6, in which said prestressed strand of material comprises a plurality of glass fiber strands impregnated with a polyamide-epoxy resin composition.

8. The method of making an article of manufacture as in claim 5, in which the binder material for the said concrete aggregates is selected from the group consisting of portland cement, white portland cement, natural cements, silicates, polymeric resins of both thermosetting and thermoplastic resins in combination, and polymeric resins of thermosetting nature.

9. The method of making an article of manufacture as in claim 5, in which in addition place an aggregate mix of blended sized colored aggregate, glass fiber and selected polymerizable unsaturated polyester resin composition on said mold release in said caul or pan and on said aggregate mix player place the woven glass fiber fabric impregnated with a polymerizable epoxy-polyamide resin composition.

10. The method of making an article of manufacture comprising a decorative-structural porous structural element having a laminated reinforcing fiber-polymeric resin composition decorative-structural facing layer, an inner core of porous structural material and a mineral bound colored facing layer comprising the steps of:

Step 1, provide a platen press upon which assemble a rigid forming means having inside of said forming means a caul or pan vessel;

Step 2, coat said caul or pan vessel with a mold release;

Step 3, place to a selected depth a blended mix comprising selected colored material, fiber reinforcement, and a selected polymeric resin composition having a curing means therefore;

Step 4, on this layer place a composite, combined two element layer of fiber reinforcements impregnated with selected polymeric resin composition, one element comprising a layer of fiber reinforcement impregnated with a selected resin composition provided by being pulled through a vessel containing said resin composition and the other element comprising a layer of fiber reinforcement impregnated with a curing agent resin composition by being pulled through a vessel containing said curing agent resin composition, the two said fiber-resin reinforcements being combined in placement on said blended mix;

Step 5, cure said layers to at least a partial state of curing;

Step 6, on said layers place a selected amount of selected core material having at least on reinforcing means therein;

Step 7, on said core material place a layer of decorative-structural facing mixture;

Step 8, with all said material placed in said rigid forming means, apply pressure and heat and cure said polymeric resin compositions to at least a non-flowable partially cured state;

Step 9, with said polymeric resin composition in a non-flowable partially cured state, move said element into a post curing chamber and complete cure of all materials and then remove from chamber ready for use.

References Cited

FOREIGN PATENTS

| 2,850,890 | 9/1958 | Rubenstein | 72—36 |
| 3,194,724 | 7/1965 | Sergovic | 161—158 |
| 3,197,352 | 7/1965 | Coates | 156—242 |

EARL M. BERGERT, *Primary Examiner.*

T. R. SAVOIE, *Assistant Examiner.*